F. Douglas,
Skate Fastening,
Nº 39,800. Patented Sep. 8, 1863.
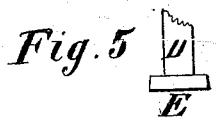
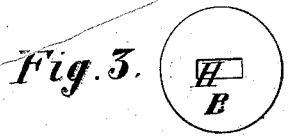
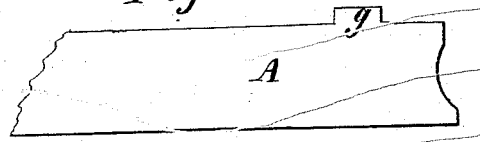
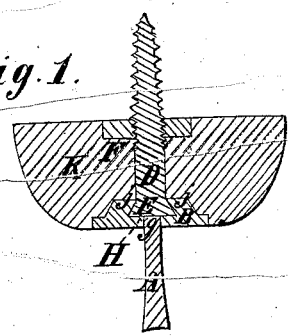
Witnesses
Othniel Gager
Zebulon R. Robbins
Inventor
Frank Douglas

UNITED STATES PATENT OFFICE.

FRANK DOUGLAS, OF NORWICH, CONNECTICUT.

IMPROVEMENT IN SKATE-FASTENINGS.

Specification forming part of Letters Patent No. 39,800, dated September 8, 1863.

*To all whom it may concern:*

Be it known that I, FRANK DOUGLAS, of Norwich, in the county of New London and State of Connecticut, have invented a new and useful Mode of Fastening Skate-Runners to the Wood or Stock; and I do hereby declare that the following is a full, clear, and exact description of the same, reference being had to the accompanying drawings, making a part of this specification, in which—

Figure 1 is a vertical section of the skate and fastening, cut through the center of the heel-screw. Fig. 2 is a section of runner. Fig. 3 is a view of under side of flange-washer. Fig. 4 is a top view of the flange-washer, showing the projections to receive screw-head. Fig. 5 is a side view of dovetail screw-head.

Similar letters of reference indicate corresponding parts of all the figures.

The object of my invention is to produce a firm and convenient fastening for a club or any other kind of skate without letting the runner into the wood or stock.

A is the runner; $g$, the projection on runner. A is fitted into hole H of flange-washer B, and firmly riveted down, as represented in Fig. 1. The projections $c\ c$ on upper side of flange-washer B are made dovetailing to receive the oblong dovetailed head E of screw D. The nut F fits onto screw D, and is let into upper side of wood or stock K.

The parts are put together as follows: Runner A is firmly riveted to flange-washer B, and the dovetailed head of screw D slides in between projections $c\ c$ of flange-washer B. The wood or stock K is counterbored on bottom to receive flange-washer B, and on top to receive nut F, which is firmly screwed down on screw D, thus binding the whole tightly together.

What I claim, and desire to secure by Letters Patent, is—

1. The flange-washer B, with projections $c\ c$, to receive a flat or dovetail head of screw D when firmly attached to a skate-runner, as herein described.

2. The screw D, with flat or dovetail head, when used in combination with the flange-washer B and nut F, for the purpose herein specified.

FRANK DOUGLAS.

Witnesses:
OTHNIEL GAGER,
ZEBULON R. ROBBINS.